United States Patent
Gordon et al.

(10) Patent No.: US 9,474,301 B2
(45) Date of Patent: Oct. 25, 2016

(54) FLOW-THROUGH CAVITATION-ASSISTED RAPID MODIFICATION OF BEVERAGE FLUIDS

(75) Inventors: Roman Gordon, Studio City, CA (US); Igor Gorodnitsky, Marina del Rey, CA (US); Varvara Grichko, Riverside, CA (US)

(73) Assignee: Cavitation Technologies, Inc., Chatsworth, CA (US)

( * ) Notice: Subject to any disclaimer, the term of this patent is extended or adjusted under 35 U.S.C. 154(b) by 666 days.

(21) Appl. No.: 12/605,810

(22) Filed: Oct. 26, 2009

(65) Prior Publication Data

US 2010/0104705 A1    Apr. 29, 2010

Related U.S. Application Data

(63) Continuation-in-part of application No. 12/395,110, filed on Feb. 27, 2009, now Pat. No. 7,762,715, and a continuation-in-part of application No. 12/464,646, filed on May 12, 2009, now Pat. No. 8,042,989.

(60) Provisional application No. 61/108,720, filed on Oct. 27, 2008.

(51) Int. Cl.
| | |
|---|---|
| *C12G 1/09* | (2006.01) |
| *A23L 2/44* | (2006.01) |
| *A23L 2/50* | (2006.01) |
| *A23L 2/70* | (2006.01) |
| *C12H 1/16* | (2006.01) |

(52) U.S. Cl.
CPC .. *A23L 2/44* (2013.01); *A23L 2/50* (2013.01); *A23L 2/70* (2013.01); *C12H 1/16* (2013.01)

(58) Field of Classification Search
CPC ......... A23L 3/015; A23L 2/50; A23L 2/54; A23L 2/70; B01D 19/00; C07C 7/11; C12H 1/00; C12H 1/06; C12H 1/16; C12H 1/165; B65D 85/73; B06B 3/00; B08B 2209/005; C12G 3/04; C12C 11/11
USPC ............ 426/590, 592, 238, 330.4, 322, 475, 426/330.3, 248
See application file for complete search history.

(56) References Cited

U.S. PATENT DOCUMENTS

| | | |
|---|---|---|
| 2,086,891 A | 7/1937 | Bachmann et al. |
| 2,088,585 A | 8/1937 | Chambers et al. |
| 2,196,193 A | 4/1940 | Chambers et al. |

(Continued)

FOREIGN PATENT DOCUMENTS

| | | |
|---|---|---|
| RU | 2143312 C1 | 6/1997 |
| RU | 2126117 C1 | 11/1997 |
| RU | 2158627 C1 | 3/1999 |

*Primary Examiner* — Vera Stulii
(74) *Attorney, Agent, or Firm* — Kelly & Kelley, LLP

(57) ABSTRACT

A method and device for manipulating alcoholic and non-alcoholic beverages to obtain desirable changes in the beverages, comprising subjecting said beverages to a flow-through hydrodynamic cavitation process and continuing the application of such process for a period of time sufficient to produce a consumable product. In the case of wine, the method includes altering the composition and accelerating the conversion of ingredients to obtain wine with a superior homogeny, an extended shelf life and a mouth feel, flavor, bouquet, color and body resembling those of wine that was subjected to a traditional oak barrel maturation. The system provided implements the described method.

21 Claims, 8 Drawing Sheets

(56) References Cited

U.S. PATENT DOCUMENTS

| | | | |
|---|---|---|---|
| 3,741,770 A * | 6/1973 | Van Olphen | 426/15 |
| 4,210,676 A | 7/1980 | Dudar et al. | |
| 5,173,318 A | 12/1992 | Leu et al. | |
| 5,969,207 A * | 10/1999 | Kozyuk | 422/127 |
| 5,971,601 A | 10/1999 | Kozyuk | |
| 6,200,486 B1 | 3/2001 | Chahine et al. | |
| 6,227,694 B1 | 5/2001 | Mitake et al. | |
| 6,502,979 B1 | 1/2003 | Kozyuk | |
| 6,705,396 B1 | 3/2004 | Ivannikov | |
| 7,198,809 B2 | 4/2007 | Leonhardt et al. | |
| 7,207,712 B2 | 4/2007 | Kozyuk | |
| 7,220,439 B2 * | 5/2007 | Leonhardt et al. | 426/15 |
| 7,247,244 B2 | 7/2007 | Kozyuk | |
| 7,338,551 B2 * | 3/2008 | Kozyuk | 95/175 |
| 2002/0168734 A1 * | 11/2002 | Grae | 435/173.1 |
| 2003/0110951 A1 | 6/2003 | Tyler, III et al. | |
| 2005/0136123 A1 | 6/2005 | Kozyuk | |
| 2006/0165855 A1 | 7/2006 | Leonhardt et al. | |

\* cited by examiner

FLOW-THROUGH CAVITATION-ASSISTED RAPID MODIFICATION OF BEVERAGE FLUIDS

BACKGROUND OF THE INVENTION

The invention relates to a method and device for manipulating homogeny, taste, flavor, body, composition and visual appearance of beverages, including accelerating wine aging and maturation of beer and liquors. More particularly, the invention relates to a short-time exposure of beverage to increased pressure, heat and vigorous mixing via flow-through hydrodynamic cavitation to achieve desirable chemical and/or physical changes in the beverage. In a matter of seconds the inventive method and device produces wines with a prolonged shelf life and taste similar to those of wines subjected to years of conventional oak barrel-aging.

Wine is an alcoholic beverage made from the pulp, juice and/or skin of grapes by fermentation, wherein yeast converts the sugars contained in the grapes to ethyl alcohol (ethanol or alcohol), carbon dioxide gas and a number of corresponding by-products, as a function of yeast strain and conditions. The conventional fermentation is carried out together with the grape skins or with minimal contact with them, depending on the type of wine. Depending on the grape variety and wine style, fermentation is done in oak barrels or inert vessels or in a combination of the two. The yeast flocculates and dies off when most of the grape sugars are exhausted. The wine then undergoes further processing, such as aging, fining, flavor modification, blending, cold stabilization, filtration and bottling.

Numerous variations on the above procedures exist. Grapes may be mixed or substituted with other berries, fruits or sugar-containing plant material. Yeast fermentation may be accompanied and/or followed by malolactic fermentation, in which malic acid is converted by lactic acid bacteria to a softer-tasting lactic acid. The addition of $K_2S_2O_5$ and pectolitic enzymes before fermentation improves color intensity and stability and increases content of total phenolics, including anthocyanins, (+)-catechin, (−)-epicatechin, rutin, and other flavonoids (Gambuti et al., 2007). Another of the procedure variations is microoxygenation, which is the controlled addition of small quantities of oxygen during the alcoholic fermentation, at the end of the primary fermentation or before malolactic fermentation. Once the treatment is finished, wine can be aged.

While some wines are bottled directly, other wines are aged in oak barrels prior to bottling, which adds an extra quality to the wine. The aging usually takes place in either oak barrels or vessels made of stainless steel or other inert material having no influence on wine taste. During the traditional aging process, wine is kept under an airlock to prevent oxidation. Unoaked wine can be briefly put in an oak barrel, or oak chips can be added. This type of aging is common in the production of less expensive wine.

Traditional oak barrel-aging is simple, but time-consuming. Peak flavor and bouquet require years to achieve and rapidly worsen thereafter. The processes taking place during wine aging are complex and very slow and include colloidal interactions between tannins, anthocyanins and their derivatives and proteins, which are broken down, and the remaining yeast, fine colloidal particles and potassium bitartrate precipitate. The initially cloudy liquid becomes clear. Aging in oak barrels is known to increase total phenolics and stabilizes wine color, but may lower the levels of anthocyanins, (+)-catechin, (−)-epticatechin, trans-resveratrol, and quercetin (Gambuti et al., 2007).

Color and taste changes during the aging of red wine are due to the reactions of the phenolic compounds that undergo numerous enzymatic and chemical reactions, such compounds being very unstable. Grape phenolics, which are responsible for the sensory properties of wine as well as the properties beneficial to human health, are very diverse in structure, ranging from simple molecules to oligomers and polymers designated as tannins, due to their ability to interact with proteins. The sensory properties of tannins and anthocyanins depend on their solubility and are affected by interactions with other wine components. The anthocyanin reactions generate colorless species and polymeric pigments that undergo sulfite bleaching while pigments with the lower molecular weight do not. The astringency loss during aging may be a result of cleavage rather than polymerization (Singleton, 1995; Poncet-Legrand et al., 2006; Cheynier et al., 2006).

In industrial aging, to imitate barrel-aging and enhance the extraction of vanillin, guaiacol and wood notes with fruity and varietal aromas the microoxygenation is commonly used in combination with oak chips (Heras et al., 2008). An alternative technology for aging red wines is electrochemical microoxidation, which is based on the precise control of the oxidation rate and treatment cut-off (Fell et al., 2007).

In practice, it is common to age wine in contact with the dead yeast cells (lees). The lees substantially affect the redox potential of the wine, making it more resistant to oxidation. Wine aged in the presence of lees is characterized by a rich nutty aroma, better creaminess and richness of mouth feel. White wine on lees is known to pick up oak notes less vigorously and integrates them into the bouquet more readily.

The aging is affected in many different ways by wine composition and the added ingredients that vary between wines and winemakers. When the wine peak has been achieved, the wine exhibits stable flavor and bouquet, being at its most preferred state for consumption. There are no precise criteria other than a subjective taste sensation and aroma that are both employed to determine whether the aging is complete and when the wine starts to decline. Following the peak period the process of decline from peak or deterioration begins, resulting in a loss of qualitative wine properties.

Prior to bottling, sulfur dioxide, sodium bisulfite, potassium bisulfite, ascorbic acid and/or other preservatives, antioxidants and food additives are introduced in almost all commercial wines to prevent oxidation, preserve flavor, and protect the color. The oxidized wine is often orange or brown, and has a distinctive taste of raisins.

During traditional oak barrel-aging, wine ingredients react very slowly with each other and the compounds extracted from the oak wood and the environment. Only low-energy reactions are feasible. Formation and/or disruption of bonds or changes in molecular structures and other chemical and physical conversions are not necessarily achieved, as these processes require more energy in order to proceed.

It has been reported that elevated pressure and increased temperature supplied by sound wave cavitation (Suslick, 1989) may accelerate aging of alcoholic beverages (Singleton and Draper, 1963). While extreme pressure or tremendous heat can be disadvantageous, the outcome of controlled treatment is highly beneficial. One approach illustrated in U.S. Pat. No. 2,086,891 to Bachmann et al. uses supersonic waves to produce a change in fermented and distilled beverages corresponding to the changes achieved via conventional aging. The treatment with the supersonic waves improves color, taste and bouquet in hours rather than the years required for a similar result through conventional aging.

Another approach is described in Japanese Patent No. 356068385 to Sakai who accelerated maturation of alcoholic beverages, such as brandy, liquor, sake, whisky or wine with the 16-60 kHz ultrasonic irradiation. The treatment is thought to promote chemical reactions of alcohols, aldehydes, esters and alkenes, such as condensation, oxidation, polymerization, and others. The treatment results in formation of new compounds with testable difference and a pleasant flavor and body.

Similarly, U.S. Patent Application Publication No. 2003/0110951 to Tyler, III et al. discloses a process for maturation of alcoholic beverages by subjecting them to ultrasound with a power of at least 5 W/L at 70-150° F. The product is superior in flavor in comparison to beverages aged by the traditional methods.

Australian Patent Application No. 2004284952 (WO/2005/042178) to Lee et al. relates to an apparatus and method for the treatment of wine using ultrasonic technology, and in particular to the introduction of a transducer of an ultrasonic processor into a wine-carrying or wine-storage container to induce ultrasonic cavitation within said wine and to thereby remove unwanted contaminates such as deposits, tartrates and residual yeasts or bacteria.

U.S. Pat. No. 7,220,439 to Leonhardt et al. describes altering the interactions of wine ingredients via application of ultrasonic radiation to a wine at a frequency causing cavitation, including when ultrasonic radiation is applied at two or more frequencies in a resonant frequency range of approximately 40-80 kHz and the two or more frequencies are applied in a sweeping manner.

Yet another U.S. Pat. No. 5,173,318 to Leu et al. describes a method of quickly aging distilled liquor that includes introducing ozone in the cooled beverage and applying an ultrasonic vibration at a frequency of 15-150 KHz to vibrate and heat the fermented product up to about 35° C. for oxidizing the fermented product.

U.S. Pat. No. 4,210,676 to Dudar et al. discloses a process for acceleration of the ripening of spirits through ultrasonic irradiation of the spirits in the presence of bouquet-improving additives, preferably wood, with an ultrasonic frequency of between 20-50 kHz and an output of about 1.7 W/L. During exposure to the ultrasonic irradiation, the alcoholic spirit is circulated through a closed system at a rate of 3-4 cycles per hour.

Effort has been undertaken to mature alcoholic beverages at frequencies below the ultrasonic range. U.S. Pat. Nos. 2,088,585 and 2,196,193 to Chambers et al. describe maturation of alcoholic beverages with sound waves, preferably in the sonic range. Although the low frequencies do create cavitation sufficient to accelerate the aging processes, the reaction products are not stable.

These and other prior patents (see, for example, U.S. Pat. No. 7,198,809 (Leonhardt et al.) and U.S. Patent Application No. 20060165855 (Leonhardt et al.) demonstrate that sound wave technology produces both pressure vibrations and cavitation that facilitate interaction of wine ingredients and extraction of wood notes in a batch environment. However, the technology could not be efficiently used in a continuous flow process because the energy density would be low and the residence time would be insufficient for the high speed production.

The prior art methods suffer from a number of other drawbacks. Since the effect of sonic cavitation diminishes with an increase in distance from the radiation source the treatment efficiency depends on container size and is low with large containers. Second, changes in fluid take place at particular locations, depending on the frequency of the radiation, i.e. its wavelength, and are not uniform throughout the volume. Thus, the efficacy of the treatment with sonic irradiation is further reduced.

The prior art techniques do not offer the most efficient method of producing a consumable beverage with an extended peak period of taste in the shortest amount of time possible. While previous uses of cavitation induced by sound waves in the acoustic range (20 Hz-20 KHz) and in the ultrasonic range (>20 KHz) claim to expedite aging of alcoholic beverages, they do no offer an optimized method for producing beverages. At the present time, with the cost of energy rising rapidly, it is highly desirable to shorten time and lower energy consumption to secure as large a profit margin as possible.

A need, therefore, exists for an advanced method and a flow-through system of beverage treatment and wine aging, with a minimal treatment time and energy cost, resulting in a product with an extended period of supreme taste, body and bouquet. The inventive method is particularly desired at harvest time, when throughput is a key demand. The present invention provides such a method and system while producing high quality beverages with superior taste, flavor, appearance, shelf life and stability made with the much faster treatment.

Hydrodynamic cavitation is the formation of gas bubbles in any turbulent fluid due to mechanically induced fluctuations in pressure. When a fluid is forced through a configuration that induces eddy currents, such as flow around surfaces or small and large cross-sectional areas in the flow stream, the fluid's velocity elevates at the expense of a drop in its pressure, causing dissolved or trapped gases and fluid vapor, i.e., volatile components, to form bubbles with a diameter from approximately 0.1 μm to a few millimeters in size. Small particulates and impurities serve as the nuclei for the bubbles. Once bubbles move from the region of the low pressure to the high pressure zone they will implode. The collapse releases a significant amount of energy in the form of shock waves, vigorous shearing forces and localized heating, all of which dissipate into the surrounding fluid. In some cases the collapse is accompanied by the formation of free radicals and the emission of UV and visible light. At the point of total collapse, the temperature and the pressure of the bubble vapors undergo temperature and pressure increases, sometimes as great as 5,000° C. and 1,000 atmospheres. (Suslick, 1989; Young 1999).

The phenomenon of cavitation is categorized by the dimensionless cavitation number $Cv=(P_\infty-P_v)/0.5\rho V_\infty^2$, where $P_v$ is the vapor pressure, $\rho$ is the liquid density, and $P_\infty$ and $V_\infty$ are the flow pressure and velocity, respectively (Passandideh-Fard and Roohi, 2008). It is known that a flow-through hydrodynamic cavitation can be created in fluid by means of various devices. See, for example, U.S. Pat. No. 7,207,712 (Kozyuk), U.S. Pat. No. 6,705,396 (Ivannikov et al.), U.S. Pat. No. 6,502,979 (Kozyuk), and U.S. Pat. No. 5,971,601 (Kozyuk), which describe a number of hydrodynamic cavitation devices and their uses.

U.S. Pat. No. 7,338,551 to Kozyuk discloses a device and method for generating microbubbles in a fluid that passes through a first local constriction of a hydrodynamic cavitation device at a velocity of at least 12 m/sec and then mixed with a gas to enhance implosion.

According to the invention of U.S. Pat. No. 6,227,694 to Mitake et al. a reaction between two or more reactive substances is generated through the collision of a jet flow of one reactive substance against a jet flow of another reactive substance at flow velocities of 4 m/sec or higher followed by furious turbulence and cavitation. The substances are flowed from different inflow passages and collided against each other at high flow rates to cause a uniform reaction within a short time. This method is advantageous for producing a dispersion containing very fine particles of submicron size.

There are many techniques for sterilization of liquid. Heating, autoclaving, treatment with antibiotics, disinfection with chlorine, ozone, permanganate and other reagents, filtration, sorption, ultraviolet and X-ray irradiation all remove pathogens. However, these techniques have disadvantages and limitations, such as insufficient efficacy, high cost, formation of unwanted by-products, risk associated with the use of hazardous compounds and harmful irradiation, and other limitations.

Cavitation in a fluid stream has found some application in controlling fluid quality. U.S. Pat. No. 6,200,486 to Chahine et al. discloses an approach utilizing cavitation occurring in shear zones associated with a jet nozzle to efficiently reduce contaminants in large volumes of liquid. The intense jet-induced cavitation triggers oxidation and reduction reactions, which cause decomposition and physical destruction of contaminants and microorganisms.

U.S. Pat. No. 7,247,244 to Kozyuk describes processes and devices for lowering the content of organic substances in fluids with the help of oxidizing agents that may be introduced into a local flow constriction in a flow-through chamber. Implosion of the cavitation bubbles, which contain and/or are associated with the oxidizing reagents, can be accompanied by the emission of ultraviolet (UV) light, ionization of the agents, generation of hydroxyl radicals, and decomposition and/or oxidation of the organic matter.

It should be emphasized that the UV-induced reactions and inactivation of microorganisms in fluids are strongly dependent upon the uniform exposure of the target species. Due to the shading effect of suspended particulate most of the current UV-based methods of both water and food sterilization exhibit limited potency.

Uniform exposure and mass transfer to the UV-irradiated surface can be achieved in an ultraviolet shockwave power reactor (UV-SPR) equipped with an inner rotating cylinder with surface cavities surrounded by a stationary quartz housing. The device allows for a UV dose increasing from 97 $J/m^2$ at 0 rpm to 742 $J/m^2$ for speeds above 2,400 rpm (Milly et al., 2007a). Inactivation of *E. coli* ATCC 25922 in apple juice and skim milk in the UV-SPR is greater by 4.5 and 3.0 logs, respectively. Although the rotor hydrodynamic cavitation inactivates various bacteria, yeast, yeast ascospores, and heat-resistant bacterial spores, system modification are needed to achieve commercial sterility in high-acid foods (Milly et al., 2007b). Lethality from the rotor hydrodynamic cavitation is known to be strongly dependent on the speed of the rotor. Processing temperatures and product exit temperature increase with maximal SPR residence time. Acidic fruit juices, salad dressings, and milk can be safely processed at reduced processing temperatures. Elevated temperature of the fluid fed in the reactor is an option to improve lethality at the relatively low pump pressure.

In addition, U.S. Patent Application No. 20050136123 to Kozyuk discloses a method for heat treating a homogenized fluid product, such as food, beverage, pharmaceutical, biotechnology, semiconductor, paint, ink, toner, fuel, magnetic media, or cosmetic industries' product, comprising feeding a stream of fluid product ingredients under pressure through a local flow constriction to induce high shear mixing of ingredients in a high shear mixing zone downstream from the constriction and forming a homogenized product at a first temperature; introducing a sufficient amount of the homogenized fluid product at a second temperature, which is less than the first temperature, into the high shear mixing zone to effectuate mixing of the homogenized fluid product at the first temperature with the homogenized fluid product at the second temperature to thereby heat treat the homogenized fluid product.

SUMMARY OF THE INVENTION

The present invention is directed to a process for modifying the properties of a beverage fluid. The process begins with pumping the beverage fluid, at a controlled inlet pressure approximating ambient pressure, through a flowpath in a multi-stage, flow-through, hydrodynamic cavitation device. The flowpath has a series of chambers with varying diameters and static elements to create sudden reductions in fluid pressure. Localized zones of reduced fluid pressure in the beverage fluid are generated as it is pumped through the flowpath. The process may also involve pumping the beverage fluid through flowpaths in multiple, multi-stage, flow-through, hydrodynamic cavitation devices arranged in series and/or parallel.

Cavitational features are created in the localized zones of reduced fluid pressure, which then collapse to expose components of the beverage fluid to sudden, localized increases in temperature and pressure. The cavitational features comprise cavitation bubbles containing vapors of volatile components in the beverage fluid. Upon collapse of the cavitation bubbles, the vapors of the volatile components in the cavitational bubbles are mixed with adjacent layers of condensed beverage fluid, transiently enriched with less volatile components of the beverage fluid. The creation and collapse of cavitational features results in the beverage fluid being pasteurized.

In these areas of localized increases in temperature and pressure, chemical reactions are induced between components in the beverage fluid. These chemical reactions promote molecular rearrangement of the components and modify properties of the beverage fluid such as taste, flavor, appearance, shelf life and stability.

The process further comprises the step of combining the beverage fluid with an additive to improve taste, flavor, appearance, shelf life or stability of the beverage fluid. The beverage fluid may also be combined with a preservative including sulfur dioxide or potassium sorbate. Preferably, the beverage fluid comprises wine and the additive involves exposing the beverage fluid to a wood source as would occur in convention barrel aging.

The process may also include the step of exposing the beverage fluid to UV light irradiation or sonic irradiation before, during or after the creation of the cavitational features. In addition, the process steps of pumping, generating, creating, collapsing and inducing may be repeated for a period of time, as necessary or sufficient to simulate conventional barrel aging of wine.

It is, therefore, an object of the present invention to provide a continuous flow method for beverage improvement and aging of wine and other alcoholic beverages in a dramatically expedited manner with optimized energy costs. Another object of the present invention is to provide a method for altering the interaction of compounds contained in wine and its environment to obtain changes resembling many years of conventional barrel-aging, homogenous texture, and a longer shelf life.

It is also an object of the present invention to induce uniform cavitation throughout the fluid volume and for a time sufficient to synthesize new molecules in a consumable product. It is also another object of the present invention to provide a method for optimizing energy usage through coupling a flow-through cavitation with ultrasonic radiation and light irradiation.

It is yet another object of the present invention to provide a method for altering the interaction of beverage ingredients with those of a container, environment or additives to obtain changes in the beverage, said method comprising subjecting them to a flow-through hydrodynamic cavitation. It is a further object of the present invention to provide a method for manipulating a beverage to obtain desirable changes, comprising subjecting the beverage to a continued application of the flow-through hydrodynamic cavitation for a duration sufficient to produce a consumable product with the desired taste and flavor.

It is still another object of the present invention to provide a method, wherein the application of a flow-through hydrodynamic cavitation is optimized to modify ingredients and produce new compounds via changing molecular, ionic or other bonds. It is yet a further object of the present invention to provide a method, wherein a flow-through hydrodynamic cavitation is carried out in a closed system filled with nitrogen, carbon dioxide or other gas or in a mixture of thereof. It is also a further object of the present invention to provide the method, wherein sound irradiation is applied by at least one source before or after a flow-through hydrodynamic cavitation.

Another object of the present invention is to provide a system for implementing the described objects comprising a beverage and a flow-through cavitational reactor for inducing cavitation in the said beverage. It is also a further object of the present invention to provide a method, wherein the application of a flow-through hydrodynamic cavitation is used to destroy or slow down growth of yeast and bacteria present in beverage.

It is a further object of the present invention to provide a method, wherein two or more a flow-through hydrodynamic cavitation reactors are employed. It is yet another object of the present invention to provide a method, wherein the flow-through hydrodynamic cavitation is applied to a heated or cooled beverage.

The present invention creates beneficial conditions that cannot be duplicated in the conventional processing of beverages and traditional aging of wine and maturation of other alcoholic beverages. The process is enhanced by virtue of high pressure, high heat, turbulence effects and vigorous mixing in localized regions applied in a flow-through manner over a short period of time. However, extreme conditions can be detrimental to the product quality. The preferred embodiments of the present invention apply optimized levels of both pressure and temperature via a flow-through hydrodynamic cavitation. The process is independent of external temperature and pressure and provides a means of changing molecular composition throughout the beverage. The complete wine aging results in a smoother taste and reduced adverse after-effects. Moreover, the stability of the produced compounds extends the peak periods of taste and bouquet, as well as, the shelf life.

Important economic benefits are also experienced through implementation of the present invention. The optimized usage of a flow-through hydrodynamic cavitational reactor serves to lower equipment, handling and energy costs, as it accelerates production of a consumable alcoholic beverage. Equipment cost is drastically reduced as expensive oak barrels, prone to biological contaminations, are no longer required. Although wood may be included in the downstream processing to cause desirable changes in the taste of beverage, it is not necessarily needed to properly mature an alcoholic beverage, using the present method and apparatus. The expedient aging and maturation negates costs related to storage and warehousing space over extended periods of time experienced with the conventional aging method. Further, a flow-through hydrodynamic cavitation does not require use of a residence container for processing as do both the conventional barrel-aging and aging through the application of sound and ultrasound irradiation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
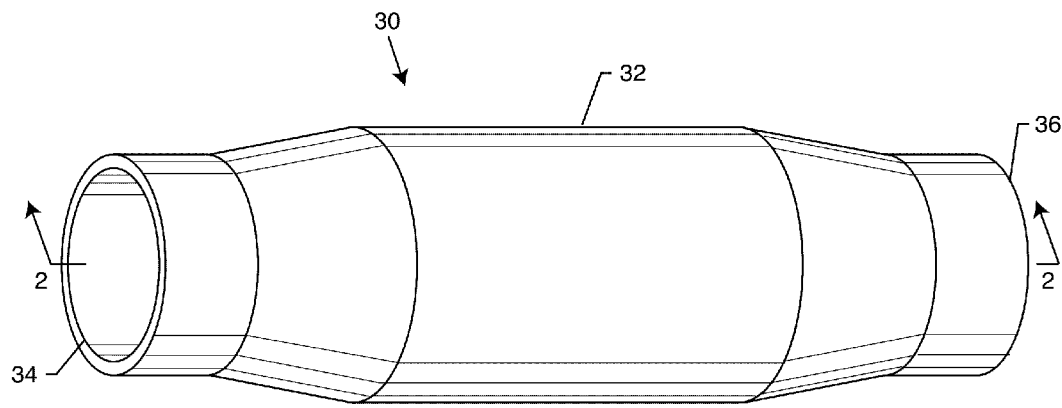
FIG. 1 is a diagram depicting a preferred embodiment of the inventive multi-stage cavitation device.

The detailed embodiments of the present invention are disclosed herein. However, it should be understood, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and how to use the invention.

The present invention is directed to a method for manipulating beverages to obtain desirable changes therein. The method comprises subjecting the beverage to a flow-through hydrodynamic cavitation and/or continuing the repeated application of the flow-through hydrodynamic cavitation for a duration sufficient for the cavitation to convert a beverage into a consumable product with the desired characteristics. The beverage may be an alcoholic or non-alcoholic beverage. The application of the flow-through hydrodynamic cavitation is optimized to obtain a flavor profile of increased intensity, modify ingredients and produce new compounds by affecting covalent, ionic, hydrogen and/or other chemical bonds. Thus, the present invention allows for expedient production of a high-grade product, generating more product over time than is possible using any other existing aging and maturation technologies.

With reference to the attached drawings, a method and system for the application of localized pressure, heat and vigorous mixing generating changes resembling conventional aging processing is disclosed. The present method and system achieves molecular changes in ingredients of a beverage through the use of a flow-through hydrodynamic cavitation, rather than traditional aging.

The objects of the present invention are achieved by flowing alcoholic beverage fluids through a flow-through hydrodynamic cavitational device to cause accelerated aging and maturation. Hydrodynamic cavitation assumes formation of vapor bubbles within a fluid accelerated to high velocities in a minuscule area. In general, fluid is accelerated by a high pressure pump. The phenomenon is called cavitation because cavities form when the liquid pressure has been reduced to the vapor pressure of components of the fluid. The vapor bubbles expand as they move and collapse upon reaching regions of a high pressure. The violent collapse causes intense shearing forces that result in thorough mixing and emulsification of two or more components/states, i.e., liquid and gas, of a fluid that is pumped into the reactor. By subjecting wine to a flow-through hydrodynamic cavitation, its molecules are activated under exposure to tremendous pressures and heat and are converted into more stable components resembling an aged product.

Energy released as a result of the bubble implosion during a flow-through hydrodynamic cavitation process activates molecules in wine forcing them to react and form entirely new compounds. The result is a stable beverage whose components will not further react with each other or undergo spontaneous transformations. The peak period is substantially extended and taste and bouquet endure much longer than those achieved by other aging technologies.

The method and system include use of a flow-through hydrodynamic cavitational reactor 30 to promote molecular bonding of the components, which occurs in a short period of time and results in a stable beverage resembling a beverage aged over many years.

Figure 2:
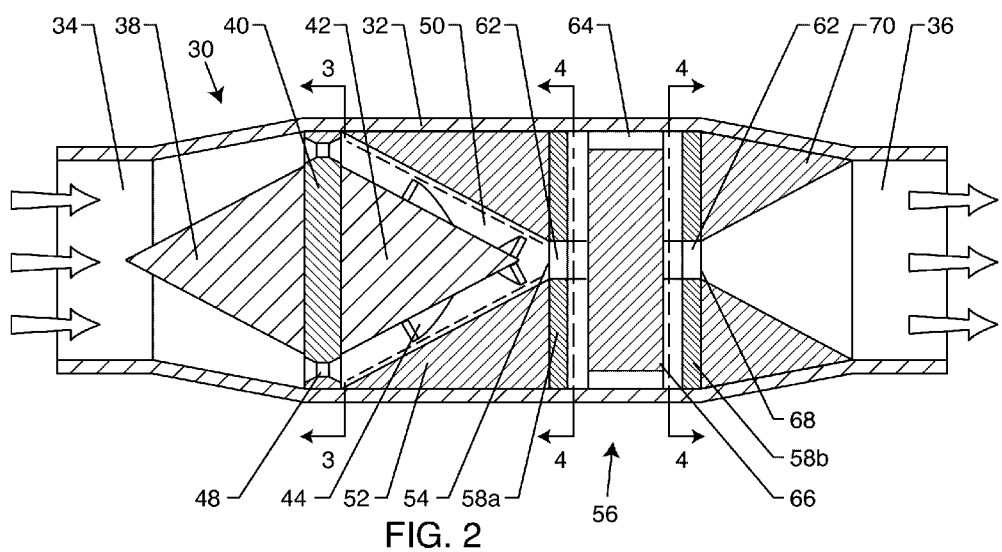
FIG. 2 is a cross-sectional view of the multi-stage cavitation device taken along line 2-2 of FIG. 1.
Figure 3:
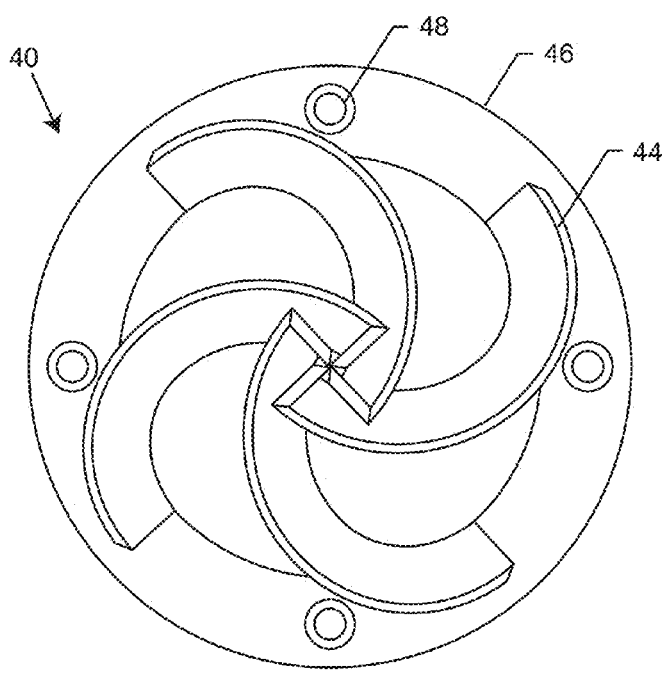
FIG. 3 is a cross-sectional view of the front end of the working chamber of the cavitation system taken along line 3-3 in FIG. 2.
Figure 4:
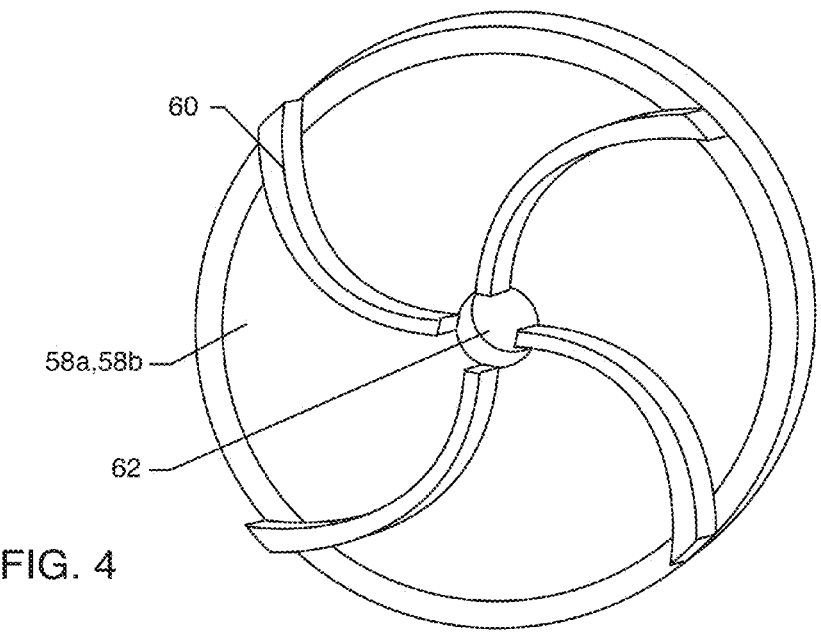
FIG. 4 is a cross-sectional view of the vortex element taken along lines 4-4 in FIG. 2.
Figure 5:
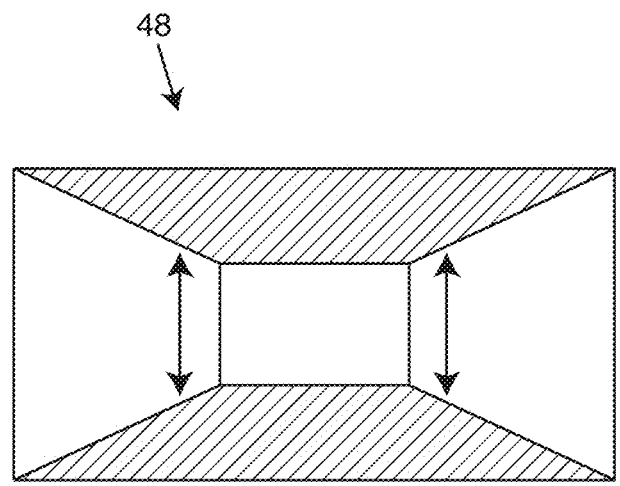
FIG. 5 is a cross-sectional view of one embodiment of a channel in a multi-jet nozzle.
Figure 6:
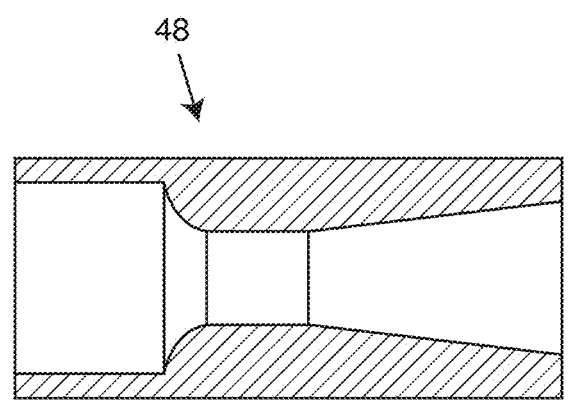
FIG. 6 is a cross-sectional view of an alternative embodiment of a channel in a multi-jet nozzle.

FIGS. 1-6 generally illustrate a first preferred embodiment of the cavitation device 30 of the present invention. This embodiment is described in co-pending U.S. patent application Ser. No. 12/359,110, the disclosure of which is incorporated herein, in its entirety. As shown in FIG. 1, the cavitation device 30 is comprised of a cylindrical body 32 made preferably of a metal, an inlet tube 34 and an outlet tube 36. An inlet cone 38 is located in front of a multi-jet nozzle 40 along the flow path. A guide cone 42 is positioned behind the nozzle 40 and features spiral guides 44. The multi-jet nozzle 40 is shaped as a disk having a perimeter ring 46 and features four channels 48 that have both across abrupt contractions and expansions (FIGS. 2 and 3). The number of spiral guides 44 is equal to the number of channels 48 in the multi-jet nozzle 40. The channels 48 have varying diameters along their lengths (FIGS. 5 and 6) and are uniformly distributed throughout the surface area of the perimeter ring 46 of the multi-jet nozzle 40 and direct flow into the working chamber 50.

The working chamber 50 is located behind the multi-jet nozzle 40 along the flow path and has an inner wall formed by the guide cone 42 and an outer wall formed by a convergent cone 52. The convergent cone 52 is co-axially aligned with the guide cone 42. An outlet 54 from the convergent cone 52 leads to a vortex chamber or generator 56, which is disposed behind the convergent cone 52. The vortex generator 56 is comprised of disks 58 with curved flow guides 60 and central holes 62 that are coaxially aligned with one another. An annular gap 64 is located between the front and rear disks 58a, 58b and around a cylinder-type body 66 of slightly smaller diameter than the vortex chamber 56 that blocks the direct path of the jet emerging from the central hole 62 in the front disk 58a. The curved flow guides 60 are raised with respect to the disks 58 so as to extend out to the cylinder type body 66.

The flow guides 60 create multiple curved flow paths from the central hole 62 in the front disk 58a to the annular gap 64 of the vortex generator 56. Similar paths are created from the annular gap 64 of the vortex chamber 56 to the central hole 36 on the rear disk 58b on the backside of the cylinder-type body 66. The central holes 36, the outlet 54 of the convergent cone 52 and an inlet 68 of the atomizing cone 70, which is situated behind the vortex generator 56 along the flow path, all have the same diameters.

Figures 7, 8:
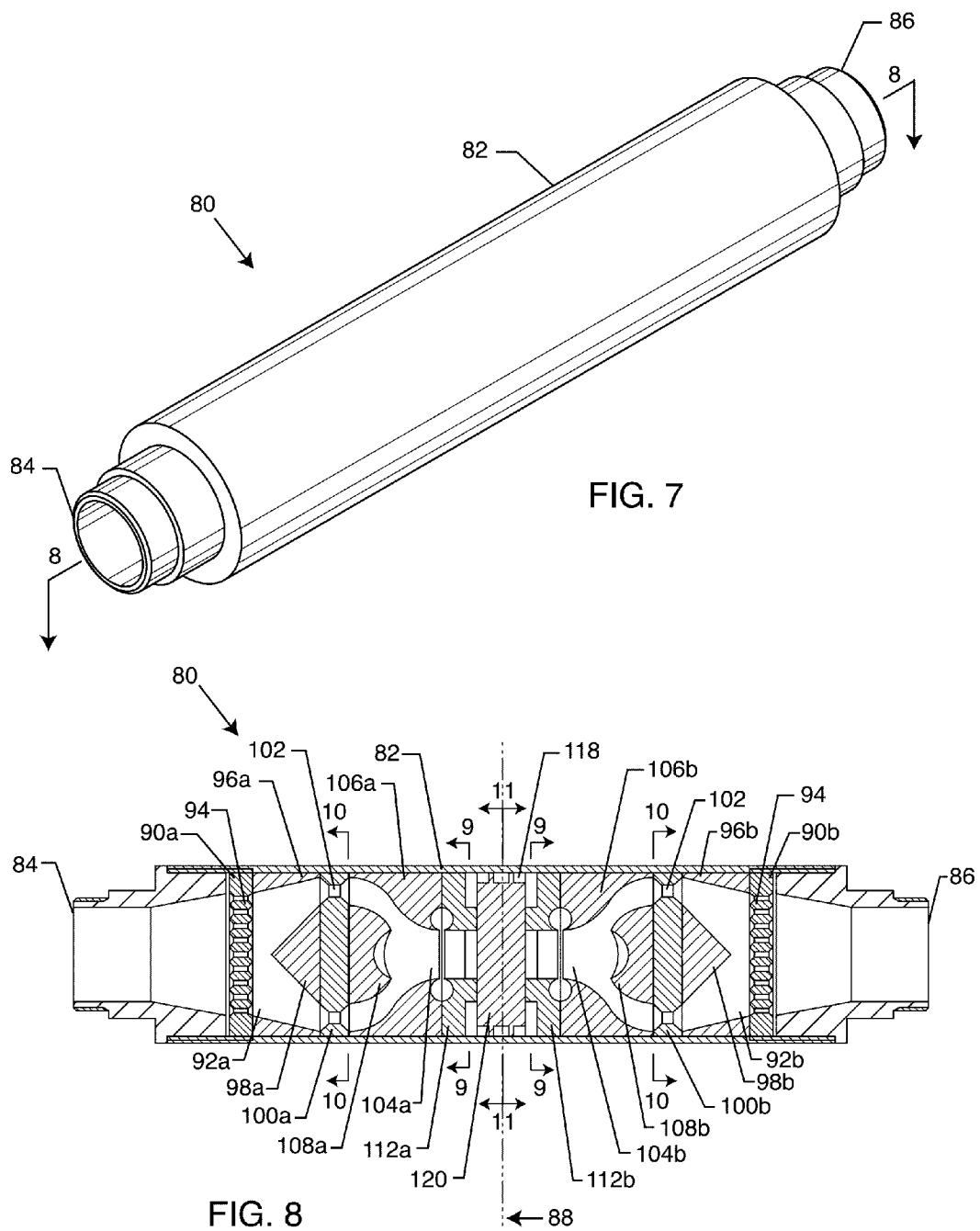
FIG. 7 is a perspective view another preferred embodiment of the inventive multi-stage cavitation device.
FIG. 8 is a cross-sectional view taken along line 8-8 of FIG. 7.

FIGS. 7-17 generally illustrate a second preferred embodiment of the cavitation device 80 of the present invention. This embodiment is described in co-pending U.S. patent application Ser. No. 12/464,646, the disclosure of which is incorporated herein, in its entirety. As shown in FIG. 7, the flow-through cavitation device 80 is comprised of a housing 82, which is attached to inlet 84 and outlet 86 pipes for direct connection to an industrial pipeline (not shown). The device 80 preferably has a mirrored symmetry such that from the inlet 84 to a mid-point 88 is repeated in reverse from the mid-point 88 to the outlet 86. The following description will follow the mirrored symmetry and describe from both the inlet 84 and outlet 86 toward the mid-point 88 simultaneously.

Assuming flow from left to right, front and end disk multi-jet nozzles 90a, 90b serve as the front and back walls of exterior working chambers 92a, 92b and are located behind the inlet pipe 84 and in front of the outlet pipe 86. The multi-jet nozzles 92 are equipped with constricting and expanding channels 94 that are distributed uniformly over the surfaces of the disks that are the multi-jet nozzles 90. The working chambers 92 are comprised of radial cones 96a, 96b and central guide cones 98a, 98b, which are attached to radial multi-jet nozzles 100a, 100b. The radial multi-jet nozzles 100 feature both constricting and expanding channels 102. The channels 102 are spread evenly over the radial perimeter surface of the radial nozzles 100, which direct the flow to interior working chambers 104a, 104b.

Flow guides 106a, 106b that direct the flowpath from the perimeter to a center of the device 80 bound the chambers 104. The cross-section of the flow guides 106 generally has an S-shape configuration. A hemi-spherical body 108a, 108b with a top niche 110 is mounted in the working chambers 104 against the radial nozzles 100. The turbulizer disk 112a, 112b (FIG. 9) with curved guides 114 and central hole 116 is located behind the guides 106 in vortex chamber 118. The vortex chamber 118 is formed of the inner wall of the housing 82 and a cylindrical body 120 disposed in the center. The vortex chamber 118 directs the flow from the hole 116 of the front disk 112a. The holes 116 in the front and rear disks 112a, 112b are coaxial. Their diameters are equal to that of holes in the guides 106. The mid-point 88 is within the vortex chamber 118.

Figure 9:
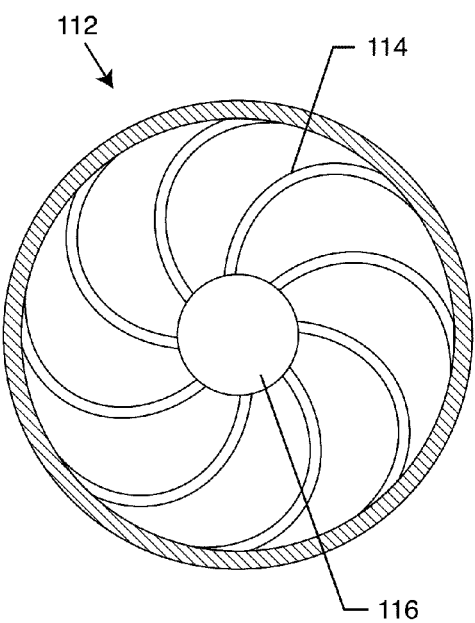
FIG. 9 is a cross-sectional view of the turbulizer disk taken along line 9-9 of FIG. 8.
Figure 10:
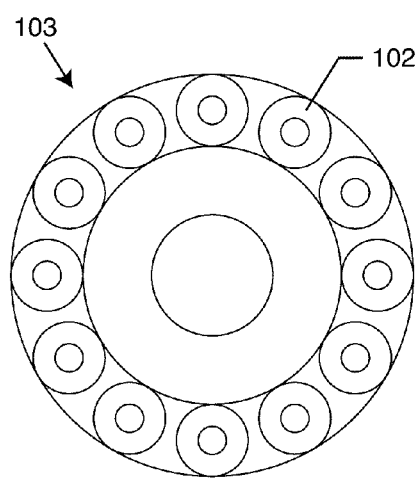
FIG. 10 is a cross-sectional view of the radial multi-jet nozzle taken along lines 10-10 of FIG. 18.
Figure 11:
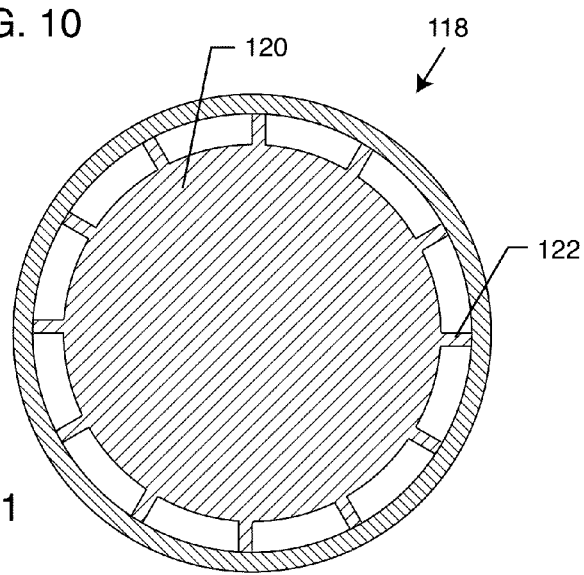
FIG. 11 is a cross-sectional view of the cylindrical body taken along lines 11-11 of FIG. 8.
Figures 12, 13:
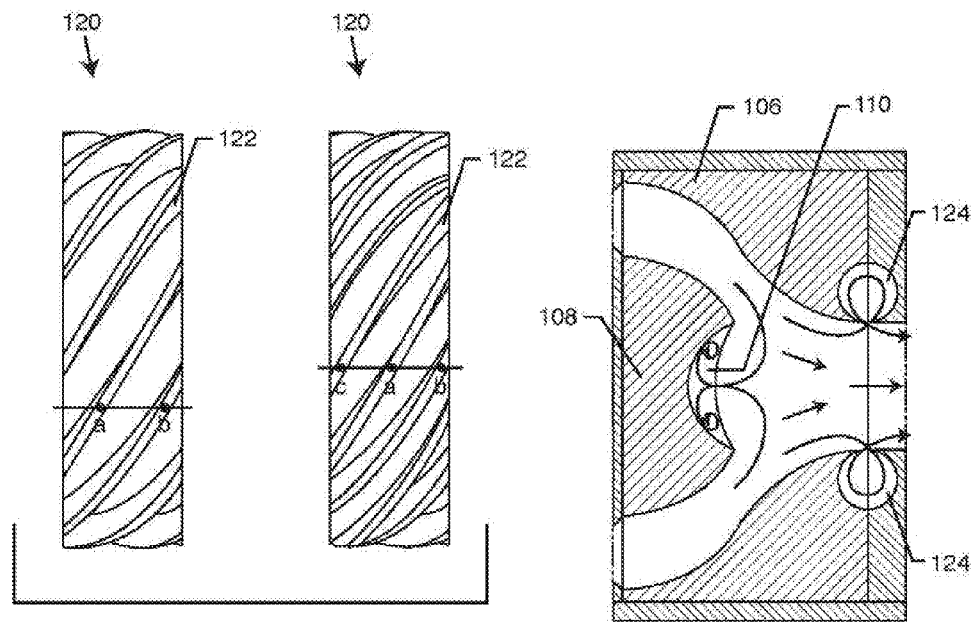
FIG. 12 is a side view of the cylindrical body.
FIG. 13 is a close-up view of the front interior working chamber and toroidal vortex chamber illustrating fluid flow.
Figures 14, 15:
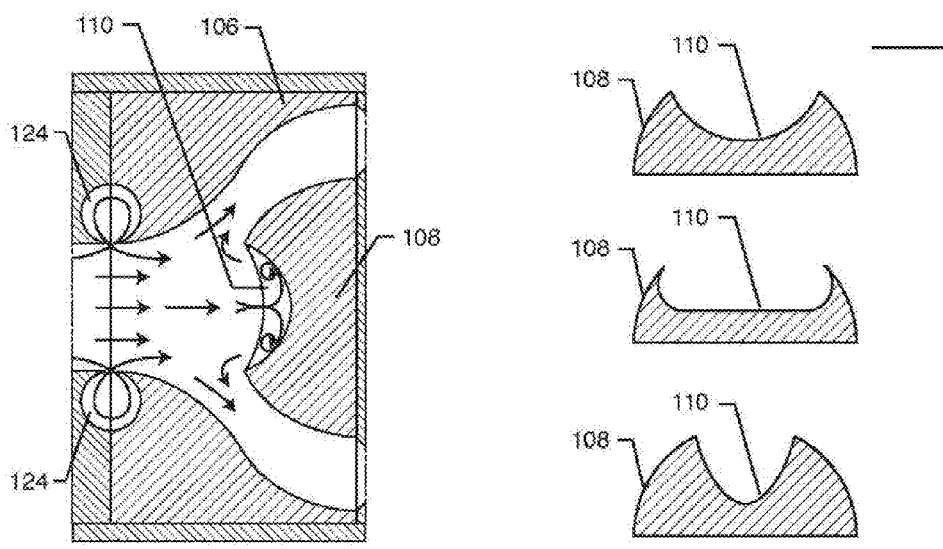
FIG. 14 is a close-up view of the back interior working chamber and toroidal vortex chamber illustrating fluid flow.
FIG. 15 is a cross-sectional view of various forms of the hemi-spherical body.

FIG. 9 is a diagram that shows disks 112a, 112b with curved guides 114 and central hole 116. An interior side of the radial multi-jet nozzles 100 is depicted in FIG. 10. The channels 102 let out into the interior working chambers 104 housing the hemi-spherical body 108 having top niche 110. FIG. 11 shows a cross-sectional view of the cylindrical body 120, which is provided with the superficial perimeter guides 122 that serve as the channels for fluid flow. FIG. 12 is a drawing of a preferred embodiment for the guides 122 of the cylindrical body 120. FIGS. 13 and 14 depict the junction between the interior working chambers 104 and the disks 112 and illustrate fluid flow therein. At the junction between the guides 106 and the disks 112 are toroidal vortex chambers 124 which are connected to the holes 116 and interior working chambers 104. FIG. 15 is a simplified schematic illustration showing various embodiments for the niche 110 in the hemispherical body 108: a hemi-sphere, a toroid, and a parabola.

Figure 16:
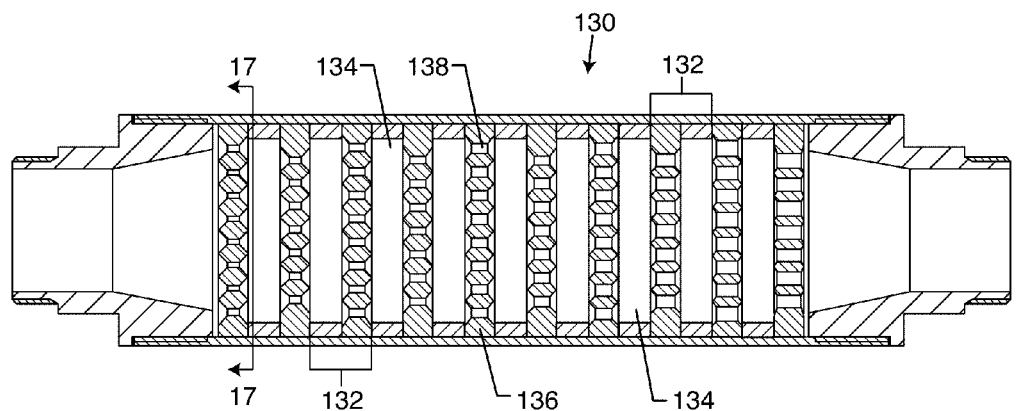
FIG. 16 is a cross-sectional view of another preferred embodiment of the multi-stage flow-through hydrodynamic cavitation device.

FIG. 16 is a drawing that illustrates another alternate embodiment for a flow-through multi-stage cavitation device 130 that provides as many as ten zones 132 for generation and collapse of cavitation bubbles and is comprised of ten identical working chambers 134 and ten multi-jet nozzles 136 that differ in respect to the cross-sectional passage areas created by their channels 138.

Figure 17:
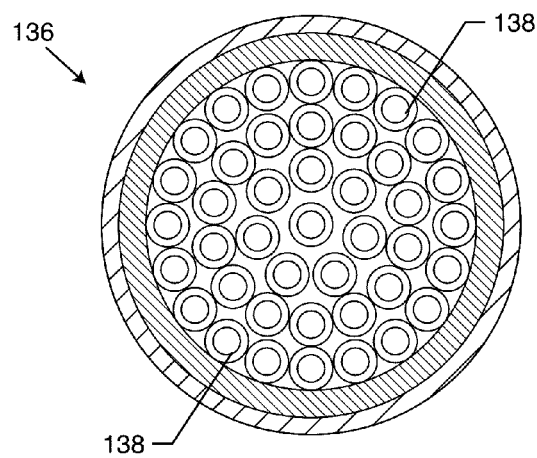
FIG. 17 is a cross-sectional view taken along line 17-17 of FIG. 16.

FIG. 17 illustrates the nozzles 136 and the channel 138 therein. The total cross-sectional channel area ($S_n$) of each multi-jet nozzle is less than that of the next multi-jet nozzle ($S_{n+1}$) following the flowpath, according to the equation: $1.0 \leq S_{n+1}/S_n \leq 1.1$, where n=1, 2, 3, 4, 5, 6, 7, 8 or 9. This helps save energy required for pumping a fluid flow through the multi-zone cavitation system. To scale back the cavitation device parts, for example, the multi-jet nozzle 136, it is necessary to place the channels 138 for fluid passage as close as possible. The number of the channels 138 of the multi-jet nozzle 136 is limited by the ratio of the total area of the largest cross-sectional openings of the channels ($S_d$) to the surface area of the multi-jet nozzle ($S_D$): $S_d/S_D \leq 0.8$, where $$S_d = \sum_{i=1}^{k} S_i(k$$

is the number of channels of the multi-jet nozzle; $S_i = \pi d_i^2/4$, where $d_i$ is the largest diameter of the channels I, and $S_D = \pi D^2/4$, where D is the multi-jet nozzle diameter.

Wine is defined as a consumable alcoholic beverage produced when sugars contained in fruit juice are converted to ethyl alcohol by yeast. When the sugar supply is depleted, the yeast dies and accumulates on the bottom of the container. As discussed above, the traditional process of oak barrel-aging and maturation of alcoholic beverages is rather simple and well understood. Over time the molecules of various compounds contained in wine interact with each other. When the aging process is complete, a relative stability sets in for a time called the peak of the wine. During its peak the wine is at the most preferred state for consumption. This period is followed by a decline from peak or deterioration, which results in a loss of quality.

In the case of alcoholic beverages, the bubbles that result from flow-through hydrodynamic cavitation contain gaseous state molecules of ethyl alcohol, water and other volatile ingredients comprising an alcoholic beverage fluid. The implosion of the bubbles releases energy that powers certain chemical reactions. The processed beverage contains the products of these reactions, i.e., the newly formed stable compounds.

The preferred embodiment of the present invention optimizes the cavitation to carry out uniform processing and full molecular conversion by applying flow-through hydrodynamic system at the most suitable pump pressure selected from a wide range of 50-5,000 psi. In contrast, sonic cavitation requires more extrement conditions and energy to achieve similar results. The intensity threshold of ultrasound cavitation in water is above 0.3 W/cm². The higher the frequency, the smaller the bubble, the greater its surface tension, and the higher the energy released by the implosion. Thus, the energy released is directly proportional to the frequency. At very high frequencies there are fewer bubbles available. Wine does not require sound intensities much above the threshold for molecular conversion of its ingredients to occur. Prior art attempts at rapidly aging wine with sonic and ultrasonic radiation ignore the energy cost and potential damage to the ingredients.

The cavitation employed in accordance with a preferred embodiment of the present invention is induced with a pump pressure lying in the range of approximately 50-5,000 psi. Therefore, a practical approach to achieving the desired degree of aging is to find a pressure that provides sufficient energy release for driving chemical conversion of the beverage components. The optimum pressures produce small cavitation bubbles in sufficient quantities to drive reactions of their ingredients. For common wines, ideal results have been produced in the pump pressure range of approximately 50 psi to approximately 5,000 psi. However, as one familiar in the art can imagine, different chemical compounds require different energies obtained through cavitation in order for the reactions to take place. Any pump pressure above 50 psi is sufficient to achieve the desired consumable product. Therefore the range of 50-5,000 psi is in no way limiting on the use of the present invention.

There is a practical limit to the use of the flow-through hydrodynamic cavitation due to the amount of power needed to create it and the volume of beverage that can be processed per time unit. The higher the pump pressure, the larger the energy release during implosion, but at a cost of increased energy consumption and the higher cost of the device being able to withstand such a high pressure.

With sonic and ultrasonic induced cavitation, the results are mixed unless cavitation is uniform throughout the fluid. Creating uniform sonic and/or ultrasonic cavitation levels in large tanks, such as those used in commercial production of alcoholic beverages, is a particular challenge and requires significant energy. Alternatively, if too much energy is applied or the treatment time is substantially increased, then the production cost goes up and there is a high chance of deterioration of the product. By applying hydrodynamic cavitation at a pump pressure designed to cause cavitation and molecular conversion consistently throughout the liquid, molecular changes take place and a desirable product is made without deterioration.

In accordance with the present invention, the alcoholic beverage is treated continuously or from time to time, by passing through a flow-through hydrodynamic cavitational chamber. The device could be placed anywhere around a processing plant. Yet another design possibility exists in which a flow-through hydrodynamic cavitation device is fixed in position, removably fixed in position, or movable. Placement of a device may be combined with placement of multiple devices. The pump pressure is increased until a proper level of cavitation in each of the devices is achieved. In practice, it is desirable to take into account the cost of the apparatus, its capabilities and the subsequent energy, maintenance and operation cost. It should be noted, that an operator of a flow-through hydrodynamic cavitation device is not required to wear high performance safety products for hearing protection, such as ear muffs or ear plugs, as would be necessary in the case of high frequency sonic-induced cavitation.

It becomes an equipment cost decision as to the type of flow-through hydrodynamic cavitation generating device configuration to use since numerous approaches are technically feasible, including rotor-stator cavitation, whether for large-scale production or small scale production. One method for ensuring the best conditions for aging is to create cavitation evenly throughout the flow avoiding excessive amounts of energy. Ideally, the energy applied may be reduced to an optimized level where cavitation still occurs and energy expenditure is the lowest.

As noted above, the size of cavitation bubbles depends on the nature of the liquid under treatment and the particular cavitational device's design, such as the flow velocity sustained by the pump. The smaller the bubble, the greater the energy released during its implosion. The effect of surface tension on the hydrostatic pressure is described as follows: $P_i = P_0 + 2a/R$, where $P_i$ is the hydrostatic pressure, $P_0$ is the reference pressure, a is the surface tension, and R is the radius of the bubble. In addition to determining the size of the bubbles, and, as a consequence, the amount of released energy, the pressure will govern the reactions of the ingredients. A particular pressure may be desirable for the lowering content of compounds responsible for hangover effect following consumption of an alcoholic beverage. A disadvantage of a higher pressure is an increase in heat release, which may become important if overheating is detrimental to the beverage quality.

The product acquired by the techniques taught herein is of better quality and has an extended peak period of bouquet and taste, than wines made in different fashions. Thus, the present invention allows for expedient production of a high grade product generating more product over time than is possible using other aging technologies. In another experiment, cavitated wine stored in an open bottle at room temperature remained of good quality for six weeks, while the non-cavitated wine exhibited the onset of spoilage in approximately ten days. The taste of whisky, brandy, beer, bourbon, cognac, red and white wines, and other alcoholic beverages was shown to be improved drastically through cavitational treatment.

Figure 18:
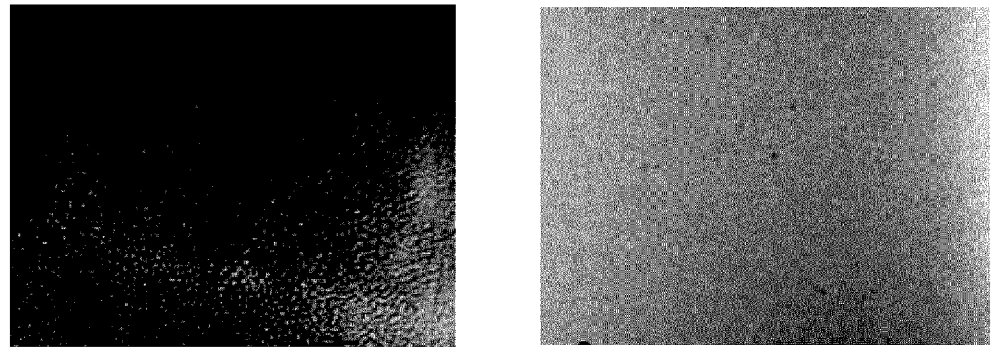
FIG. 18 depicts side-by-side photographs taken with an optical microscope equipped with a digital camera showing tomato juice before and after processing through a flow-through hydrodynamic cavitational reactor.
Figure 19:
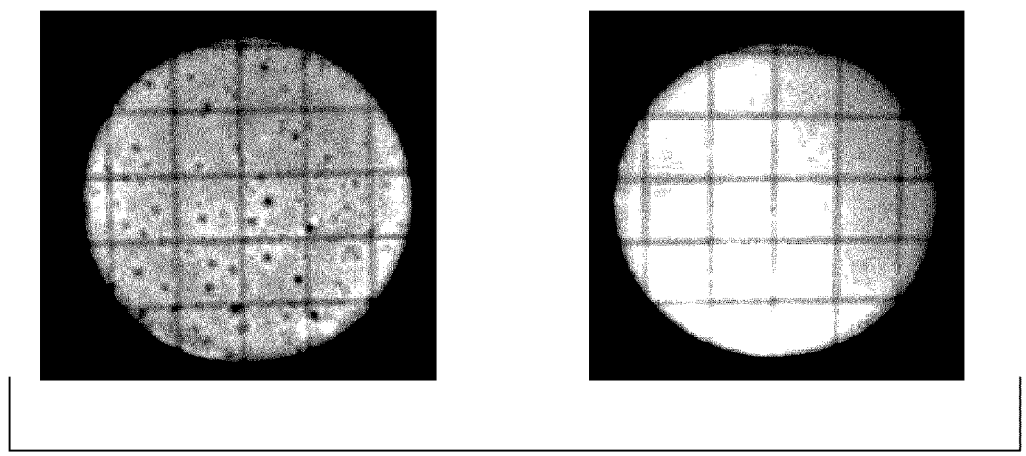
FIG. 19 depicts side-by-side photographs of two yeast count plates showing viable yeast cells in a beverage before and after processing through a flow-through hydrodynamic cavitational reactor.

The application of the cavitation process reduces the time needed for the desired homogeny to occur and, therefore, lowers the cost of the commercial process. As depicted in FIG. 18, pictures of tomato juice taken through an optical microscope equipped with a digital camera show improved homogeny of the tomato juice after being processed in a flow-through hydrodynamic cavitational reactor. Tomato juice before processing is shown on the left and after processing on the right. Treatment times between fluids may differ due to the composition and additives introduced in the course of manufacture but the end result is the extremely expedient production of a desirable product. The temperature and pressure supplied by flow-through hydrodynamic cavitation can be both immediately and effectively dispersed, thereby producing changes without causing a detrimental effect. As depicted in FIG. 19, side-by-side photos of two yeast count plates show a dramatically decreased concentration of viable yeast cells in a beverage after processing in a flow-through hydrodynamic cavitational reactor. The beverage before processing is shown on the left and after processing on the right.

Flow-through hydrodynamic cavitation is also employed to destroy enzymes, biologically active substances, yeast, bacteria and other microorganisms present in the beverage fluid or to decrease their activity and slow down growth and multiplication. The flow-through hydrodynamic cavitation process may be applied to a preliminary heated or cooled beverage. The flow-through hydrodynamic cavitation process leaves residual sugar in wine and stops fermentation by removing the yeast from the wine followed by the addition of sulfur dioxide. Copper sulfate, activated carbon or other agents are added to wine to remove hydrogen sulfide and other off-colors and odors.

The flow-through hydrodynamic cavitation may be carried out in a closed system filled with nitrogen, helium, carbon dioxide or other gas or a mixture thereof. It may also be carried out in the presence of sulfur dioxide, sodium bisulphate, potassium bisulphate, ascorbic acid, or other reducing and tannin-solubilizing agents and additives or a mixture thereof. It may be further carried out in the presence of gas-forming compounds, preferably carbonates, to increase the average size of cavitation bubbles and improve treatment efficiency. It may also be carried out with the taste-defying additives, preferably oak powder, followed by a separation step, if needed.

Pasteurization is a step in the brewing process in which the fluid, i.e., beer, is slowly heated to kill off any existing bacteria to extend shelf life. It is common in mass-produced beers such as lite beers, and lagers and less commonly in ales. The flow-through hydrodynamic cavitation process can be used to pasteurize beer and/or improve its flavor at any stage of manufacture, including mass production.

In most wine making processes, sulfur dioxide, potassium sorbate and/or other preservatives are added to inhibit oxidation and growth of harmful bacteria and fungi to prevent wine spoilage. It is important to fully disperse these ingredients throughout the beverage to enhance preservation, and the flow-through hydrodynamic cavitation accomplishes this goal.

With a further increase in pump pressure it is possible to destroy microorganisms and sterilize a beverage fluid, including juices and other non-alcoholic beverages. The cost of using cavitation in this fashion would have to be measured against the benefits gained to see if it is justified for a particular application.

The beneficial effects gained through the present invention cannot be achieved through a conventional aging process or sonic/ultrasonic-induced aging processes because the conditions created in the inventive process simply do not exist and cannot be duplicated by other processes. In a conventional oak barrel aging process, a great number of interactions take place, but it is the completeness of the blending of the components that determines appearance, body, bouquet and flavor. After the blending has reached its peak the wine quality begins to deteriorate. In sonic-induced cavitation, cavitation bubbles form a barrier to transmission and attenuate the sound waves due to their scattering and dispersion effects, limiting the effective distance of the sound waves. Furthermore, the sonic irradiation is only capable of modifying the composition at specific locations within the liquid, depending on the wavelength, interference patterns and the power of the radiation source.

The present invention overcomes these limitations, chemically and physically changing the composition of the beverage in a uniform manner. The inventive method changes the molecular structure of the fluid to a greater degree, combining various compounds, and reducing the size of molecules by supplying energy sufficient to drive other chemical reactions. Therefore, this invention provides a better means of creating high-quality alcoholic beverages with prolonged shelf life and juices with superior homogeny.

It is important that the flow-through hydrodynamic cavitation is used at the proper stage of manufacturing both alcoholic and nonalcoholic beverages. Since bubble implosion can destroy yeast and lactic acid bacteria (Milly et al., 2007b), it may be preferred not to use it during primary fermentation and before or during malolactic fermentation. It should be noted that lactic acid bacteria and yeast may stay intact at reduced temperatures and less intense cavitation. After the wine has reached a satisfactory level of ethanol and sugar depletion, the flow-through hydrodynamic cavitation may be applied without fear of damaging yeast and valuable bacteria.

The beverage may be irradiated with UV, visible and/or IR light from at least one light source prior to and/or after the beverage processing with a flow-through hydrodynamic cavitational reactor. A sonic and/or ultrasonic irradiation may be applied by at least one transducer prior to and/or after the flow-through hydrodynamic cavitation treatment.

Various detailed embodiments of a cavitation device 30, 80, 100 of the present invention are disclosed herein. Any one of these described embodiments are capable of achieving the stated results for the modification of beverage fluids using the inventive process as described herein. However, it should be understood, that the disclosed embodiments are merely exemplary of the cavitation device, which may be embodied in various forms. Therefore, the details disclosed herein are not to be interpreted as limiting, but merely as the basis for the claims and as a basis for teaching one skilled in the art how to make and use the present invention.

Although several embodiments have been described in detail for purposes of illustration, various modifications may be made without departing from the scope and spirit of the invention.

What is claimed is:
1. A process for accelerating aging and maturation of an alcoholic beverage fluid, comprising the steps of:
providing a flowpath through a multi-stage, flow-through, hydrodynamic cavitation device, wherein each stage comprises one of a plurality of localized zones having a contraction of the flowpath configured to create cavitational vapor bubbles of volatile components in the alcoholic beverage fluid;
pumping the alcoholic beverage fluid through a first localized zone having a radial multi-jet nozzle with a plurality of channels presenting the contraction of the flowpath in the first localized zone and an inlet cone disposed in front of the radial multi-jet nozzle directing the alcoholic beverage fluid to the plurality of channels in the radial multi-let nozzle;
conveying the alcoholic beverage fluid through a second localized zone in which the fluid is conveyed through a working chamber having a guide cone featuring a spiral flow guide for each of the plurality of channels in the radial multi-let nozzle and a convergent cone co-axially aligned with the guide cone forcing the fluid to be guided by the spiral flow guides presenting the contraction of the flowpath in the second localized zone;
guiding the alcoholic beverage fluid through a third localized zone in which the fluid is guided through to a vortex chamber, the vortex chamber having a first and a second disk, the first and second disks having curved flow guides, creating multiple curved flowpaths, and central holes that are co-axially aligned with one another, and an annular gap, around a cylinder-type body between the first and second disks presenting the contraction of the flowpath in the third localized zone, such that the fluid is forced through the curved flowpaths of the first disk, through the annular gap, and through the flowpaths of the second disk;
generating an area of reduced fluid pressure in the alcoholic beverage fluid resulting from being pumped through the contraction of the flowpath in each of the plurality of localized zones, such contraction resulting in increased flow velocity which causes a reduction in fluid pressure;
creating cavitational vapor bubbles of volatile components in the alcoholic beverage fluid resulting from the area of reduced fluid pressure, wherein the volatile components form vapors at the reduced fluid pressure;
collapsing the cavitational vapor bubbles upon leaving each of the plurality of localized zones;
mixing vapors of the volatile components with adjacent layers of less volatile components in a condensed alcoholic beverage fluid upon collapse of the cavitational vapor bubbles;
simultaneously exposing the volatile components and the adjacent layers of less volatile components to sudden, localized increases in temperature and pressure upon collapse of the cavitational vapor bubbles;
destroying enzymes, biologically active substances, yeast, and bacteria in the alcoholic beverage fluid during the exposing step so as to decrease activity of the enzymes and biologically active substances and to slow growth and multiplication of the yeast and bacteria; and
inducing processes and chemical reactions between the vapors of the volatile components and the less volatile components to promote accelerated aging and maturation of the alcoholic beverage fluid.

2. The process of claim 1, further comprising the step of combining the alcoholic beverage fluid with an additive to improve taste, flavor, appearance, shelf life or stability of the beverage fluid.

3. The process of claim 1, wherein the providing step involves providing multiple, multi-stage, flow-through, hydrodynamic cavitation devices arranged in series and/or parallel.

4. The process of claim 1, further comprising the step of combining the alcoholic beverage fluid with a preservative including bisulfite, ascorbic acid, sulfur dioxide or potassium sorbate.

5. The process of claim 1, further comprising the step of repeating the pumping and conveying steps for a period of time sufficient to simulate conventional barrel aging of the alcoholic beverage fluid.

6. The process of claim 1, wherein the alcoholic beverage fluid comprises wine, beer, liquor, brandy, sake, or whisky.

7. The process of claim 6, wherein the alcoholic beverage fluid comprises wine or brandy and further comprising the step of exposing the alcoholic beverage fluid to a wood source.

8. The process of claim 1, wherein the alcoholic beverage fluid comprises wine and wherein the destroying step comprises the step of destroying yeast in the wine so as to stop fermentation and leave residual sugar in the wine.

9. The process of claim 8, further comprising the steps of adding a preservative to the wine so as to inhibit oxidation and growth of harmful bacteria and fungi, and fully dispersing the preservative throughout the wine during the mixing step.

10. The process of claim 1, wherein the generating, creating, and collapsing steps each comprise the step of:
forming microbubbles in the alcoholic beverage fluid following collapse of the cavitational vapor bubbles, which microbubbles are nuclei for the creation of cavitational vapor bubbles in a subsequent localized zone.

11. The process of claim 10, wherein the creating and collapsing steps result in the pasteurization of the alcoholic beverage fluid.

12. A process for accelerating aging and maturation of wine, comprising the steps of:
introducing the wine to an inlet on a multi-stage, flow-through, hydrodynamic cavitation device;
adding a preservative to the wine so as to inhibit oxidation and growth of harmful bacteria and fungi;
passing the wine through a flowpath in the hydrodynamic cavitation device, the flowpath having at least ten cavitation zones, wherein a disk multi-let nozzle comprises each of the at least ten cavitation zones along the flowpath, wherein a plurality of through channels are disposed across a surface of each disk multi-jet nozzle, wherein each channel includes expansions and contractions of its cross-sectional area along its length, wherein the cross-sectional area of each through channel of the disk multi-let nozzles obeys the formula:

$1.0 \leq S_{n+1}/S_n \leq 1.1$, where n is a counter equal to the number of a particular disk multi-let nozzle along the flowpath;
exposing the wine to cavitation inducing features in each of the at least ten cavitation zones to create cavitational vapor bubbles of ethyl alcohol in the wine;
collapsing the cavitational vapor bubbles between every two adjacent of the at least ten cavitation zones;
mixing vapors of the ethyl alcohol with adjacent layers of liquid in a condensed wine upon collapse of the cavitational vapor bubbles;
fully dispersing the preservative throughout the wine during the mixing step;
simultaneously exposing the vapors of the ethyl alcohol and the adjacent layers of liquid to sudden, localized increases in temperature and pressure upon collapse of the cavitational vapor bubbles; and
inducing processes and chemical reactions between the vapors of the ethyl alcohol and the adjacent layers of liquid to promote accelerated aging and maturation of the alcoholic beverage fluid.

13. The method of claim 12, wherein the exposing step comprises the steps of:
generating an area of reduced fluid pressure in the wine resulting from being pumped through a contraction of the flowpath in each of the at least ten cavitation zones, such contraction resulting in increased flow velocity which causes a reduction in fluid pressure; and
creating cavitational vapor bubbles of the ethyl alcohol in the wine resulting from the area of reduced fluid pressure, wherein the ethyl alcohol forms vapors at the reduced fluid pressure.

14. The method of claim 12, wherein the collapsing step further comprises the step of forming microbubbles in the wine following collapse of the cavitational vapor bubbles, which microbubbles are nuclei for the creation of cavitational vapor bubbles in a subsequent cavitation zone.

15. The process of claim 12, further comprising the step of combining the wine with an additive to improve taste, flavor, appearance, shelf life or stability of the alcoholic beverage fluid.

16. The process of claim 12, wherein the introducing step involves introducing the wine to inlets on multiple, multi-stage, flow-through, hydrodynamic cavitation devices arranged in series and/or parallel.

17. The process of claim 12, further comprising the step of exposing the wine to a wood source.

18. The process of claim 12, wherein the preservative includes bisulfite, ascorbic acid, sulfur dioxide or potassium sorbate.

19. The process of claim 12, further comprising the step of repeating the passing and exposing steps for a period of time sufficient to simulate conventional barrel aging of the wine.

20. The process of claim 13, wherein the creating and collapsing steps result in the pasteurization of the wine.

21. A process for accelerating aging and maturation of an alcoholic beverage fluid, comprising the steps of:
providing a flowpath through a multi-stage, flow through hydrodynamic cavitation device having at least two planes of symmetry, wherein each stage comprises one of a plurality of localized zones having a contraction of the flowpath configured to create cavitational vapor bubbles of volatile components in the alcoholic beverage fluid;
pumping the alcoholic beverage fluid through a front disk multi-jet nozzle having a plurality of constricting and expanding channels to a first exterior working chamber having a first central guide cone and first radial multi-jet nozzles, such that the first central guide cone conveys the fluid to the first radial multi-jet nozzles;
conveying the alcoholic beverage fluid through the first radial multi-jet nozzles to a first interior working chamber;
directing the alcoholic beverage fluid from a perimeter to a center of the first interior working chamber through a pathway formed by a first central hemispherical body and a first flow guide disposed around the perimeter of the first interior working chamber;
mixing the alcoholic beverage fluid in the first interior working chamber by a first top niche formed in the pole of the first central hemispherical body and by a first pair of toroidal vortex chambers;

conveying the alcoholic beverage fluid through a central vortex chamber having a front disk, a cylindrical body, and a rear disk, wherein the fluid is conveyed from the center of the vortex chamber to a perimeter thereof by curved guides in the front disk, conveyed through superficial perimeter guides in the cylindrical body, and conveyed from the perimeter of the vortex chamber to the center thereof by curved guides in the rear disk;

conveying the alcoholic beverage fluid through a second interior working chamber where the fluid is directed from a center to a perimeter of the second interior working chamber through a pathway formed by a second central hemispherical body and a second flow guide disposed around the perimeter of the second interior working chamber;

mixing the alcoholic beverage fluid in the second interior working chamber by a second pair of toroidal vortex chambers and a second top niche formed in the pole of the second hemispherical body;

conveying the alcoholic beverage to a second exterior working chamber through second radial multi-jet nozzles and directing the water from a perimeter to a center of the second exterior working chamber by a second central guide cone and a second perimeter radial cone; and conveying the alcoholic beverage through a rear disk multi jet nozzle, having a plurality of constricting and expanding channels, to an outlet of the hydrodynamic cavitation device.

* * * * *